United States Patent [19]
Jain

[11] Patent Number: 5,159,541
[45] Date of Patent: Oct. 27, 1992

[54] ASYMMETRICAL PULSE WIDTH MODULATED RESONANT DC/DC CONVERTER

[75] Inventor: Praveen K. Jain, Kanata, Canada

[73] Assignee: Northern Telecom Limited, Montreal, Canada

[21] Appl. No.: 786,221

[22] Filed: Oct. 31, 1991

[51] Int. Cl.⁵ .......................................... H01M 3/337
[52] U.S. Cl. ..................................... 363/26; 363/24; 363/98; 363/131
[58] Field of Search ....................... 363/17, 24, 25, 26, 363/95, 97, 98, 124, 131, 132, 133, 134

[56] References Cited

U.S. PATENT DOCUMENTS

| | | |
|---|---|---|
| 4,355,243 | 10/1982 | Tellert . |
| 4,679,129 | 7/1987 | Sakakibara et al. . |
| 4,720,667 | 1/1988 | Lee et al. . |
| 4,720,668 | 1/1988 | Lee et al. . |
| 4,814,962 | 3/1989 | Magalhaes et al. . |
| 4,833,584 | 5/1989 | Divan . |
| 4,841,220 | 6/1989 | Tabisz et al. . |
| 4,857,822 | 8/1989 | Tabisz et al. . |
| 4,876,635 | 10/1989 | Park et al. ............................ 363/17 |
| 4,935,857 | 6/1990 | Nguyen et al. . |
| 4,992,919 | 2/1991 | Lee et al. . |

FOREIGN PATENT DOCUMENTS 1167916  5/1984  Canada .

Primary Examiner—Emanuel T. Voeltz
Attorney, Agent, or Firm—Yoshiharu Toyooka

[57] ABSTRACT

New topologies for pulse width modulated resonant DC/DC converters are disclosed. The converters include a bridged chopper to convert the DC input to a high frequency AC which in turn is fed to a high frequency transformer whose secondary AC is rectified and filtered to produce a stable DC output. The bridged chopper has at least two semiconductor switches which alternately conduct. The duty cycles of the conduction of the switches are complementary with one another and adjustable to control the stable DC output. A resonant circuit is connected between the chopper and the high frequency transformer and contains a series capacitor, and a series or parallel inductor depending upon the preferred embodiment.

6 Claims, 5 Drawing Sheets

ASYMMETRICAL PULSE WIDTH MODULATED RESONANT DC/DC CONVERTER

FIELD OF THE INVENTION

The present invention relates generally to constant frequency resonant DC/DC converters. In particular, it is directed to pulse width modulated resonant DC/DC converters in which the output voltage is controlled by the pulse width of switching pulses while their frequency stays constant.

BACKGROUND OF THE INVENTION

In many advanced telecommunication systems, particularly optical systems, Point of Use Power Supplies (PUPS) are used to supply conditioned power to each electronic card. Some of the basic requirements for this power conversion are:
(1) High power density
(2) High efficiency
(3) Low EMI (both conducted and radiated), and
(4) Constant operating frequency In order to achieve high power densities, there is a trend to operate power supplies at higher switching frequencies. As the switching frequencies increase, the switching losses associated with the turn-on and turn-off of the devices in the power supplies also increase. In switch mode power supplies, these losses are so significant that the operation of the power supplies at very high frequencies are prohibitive due to low conversion efficiencies. However, in resonant mode power supplies, the switching losses are low which allow the operation of resonant converters at very high frequencies. The resonant mode DC/DC converter can be classified into the following categories:
(1) Full-Resonant DC/DC converters
(2) Quasi-Resonant DC/DC converters
(3) Multi-Resonant DC/DC converters A number of U.S. Patents, e.g. U.S. Pat. No. 4,814,962, issued Mar. 21, 1989, to Magalhaes et al; U.S. Pat. No. 4,679,129, issued Jul. 7, 1989, to Sakakibara et al; U.S. Pat. No. 4,355,243, issued Oct. 19, 1982, to Tellert; U.S. Pat. No. 4,935,857, issued Jun. 19, 1990, to Nguyen et al; U.S. Pat. No. 4,992,919, issued Feb. 12, 1991, to Lee et al; and U.S. Pat. No. 4,833,584, issued May 23, 1989, to Divan, describe full-resonant DC/DC converters. U.S. Pat. Nos. 4,720,667 and 4,720,668, both issued to Lee et al on Jan. 19, 1988, on the other hand, disclose quasi-resonant DC/DC converters, while U.S. Pat. No. 4,841,220, issued Jun. 20, 1989, to Tabisz et al, and U.S. Pat. No. 4,857,822, issued Aug. 15, 1989, to Tabisz et al teach multi-resonant DC/DC converters. The converter topologies reported in the referenced patents have reduced to near zero switching losses, however, their output voltage is controlled and/or changed by varying the operating/switching frequency. These converters are, therefore, unsuitable for the application where system synchronization is required, e.g. telecommunications.

The present inventor's co-pending U.S. patent applications, Ser. Nos. 07/627,157 and 07/676,597, teach constant frequency resonant DC/DC converters. These converters exhibit near zero switching losses and can be operated at very high frequency. However, their power and control circuitry are complex and have a high component count. These converter circuits offer high power densities at medium-to-high power levels, however, at low-to-medium power levels, these converters do not give high power densities due to a high component count.

Canadian Patent No. 1,167,916, issued May 22, 1984, to White describes constant frequency half-bridge series resonant DC/DC converters. This converter circuit uses symmetrical pulse-width modulation (PWM) to vary the periodic energization of the series tuned circuit employed to drive a transformer and an associated rectifier. The symmetrical PWM series resonant circuit as taught in the patent has the following disadvantages:

(1) turn-on and turn-off losses are present for both the switches;

(2) high switching transient voltages are caused across the switches due to recovery current of the body diodes whenever the switch is turned-off after the conduction of its body diode.

(3) Any snubber capacitor (including drain-to-source capacitor) which is placed across the switch to absorb high switching transient voltages is discharged into the switch on turn-on. This gives rise to $\frac{1}{2} CV^2$ losses.

The above losses increase with increasing switching frequency. This limits the operation of the converter at high frequencies.

OBJECTS OF THE INVENTION

It is therefore an object of the present invention to provide a constant frequency resonant DC/DC converter with improved performance.

It is another object of the present invention to provide a constant frequency resonant DC/DC converter which is able to operate at a high switching frequency with high efficiency.

It is yet another object of the present invention to provide a constant frequency resonant DC/DC converter in which the duty cycles of the switching pulses are especially designed to give a higher efficiency.

SUMMARY OF THE INVENTION

Briefly stated the present invention is directed to an asymmetrical pulse width modulated constant frequency resonant DC/DC converter. The converter comprises bridged chopper means for converting a DC input to a constant high frequency AC and resonant circuit means including a series resonant capacitor and a resonant inductor for sending the high frequency AC to high frequency transformer means to generate a transformer secondary AC. It further includes rectifier means connected to the high frequency transformer means to rectify the transformer secondary AC to produce a stable DC output. The bridged chopper means include at least two semiconductor switches, each having a snubber capacitor connected thereacross. The switches alternately conduct and the duty cycles of the conduction of the switches are complementary with one another. The duty cycles are further adjustable to maintain the stable DC output.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

Figure 1:
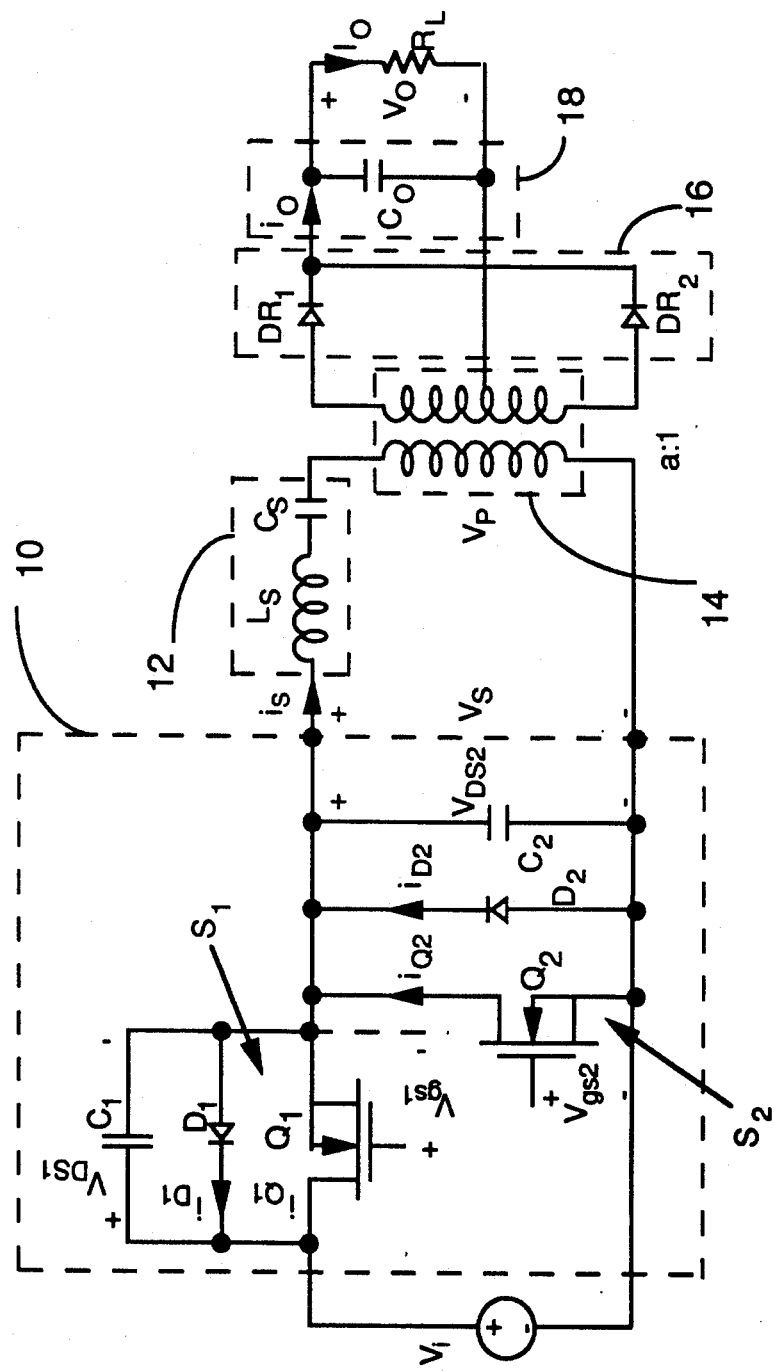
FIG. 1 is a circuit diagram of the resonant DC/DC converter according to one embodiment of the present invention.

FIG. 1 shows a circuit diagram of the Asymmetrical Pulse Width Modulated (APWM) series resonant DC/DC converter according to one embodiment of the present invention. This circuit consists of a chopper circuit 10, a series resonant circuit 12, a high frequency transformer 14, a rectifying circuit 16, and an output filter 18. The chopper circuit 10 is a half bridge inverter and contains two switches ($S_1$ and $S_2$), two diodes ($D_1$ and $D_2$) and two snubber capacitors ($C_1$ and $C_2$). Of course a full bridge inverter can be used in place of the half bridge one with proper modifications. In this embodiment, high frequency MOSFET switches ($Q_1$ and $Q_2$) are employed for $S_1$ and $S_2$ and while shown in the Figure, no external diode is required across the switch as body diodes of the MOSFETs serve the function for $D_1$ and $D_2$. The function of this chopper circuit is to convert DC input voltage to high frequency unidirectional voltage waveform $V_s$ at its output.

The series resonant circuit 12 consists of a series capacitor $C_s$ and a series inductor $L_s$. The function of capacitor $C_s$ is twofold: (a) it blocks the DC component of output voltage $V_s$ from passing to the high frequency transformer, and (b) it forms a resonant circuit together with inductor $L_s$. The function of the series resonant circuit is to convert the unidirectional voltage $V_s$ into resonating current $i_s$. Although this embodiment employs a series resonant circuit, other resonant circuits, e.g. a parallel resonant circuit or a combination of both, can be used in its place, as will be discussed later.

The high frequency transformer 14 provides matching and isolation for the output voltage of the converter. The rectifying circuit 16 which includes diodes $D_{R1}$ and $D_{R2}$ converts the resonating current $i_s$ into unidirectional current $i_o$ at its output. The output filter 18 which consists of a capacitor $C_o$ filters out the high frequency ripple current of $i_o$ and provides an essentially ripple free substantially constant output voltage $V_o$ across the output load.

Figure 2:
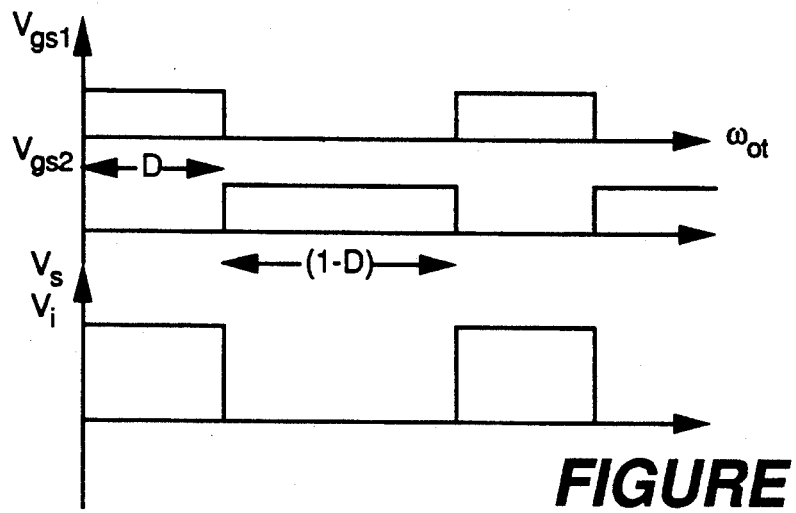
FIG. 2 shows pulses applied to the switches and the output voltage of the bridged chopper circuit.

According to the present invention, the gating signals applied to switches $S_1$ and $S_2$ are such that they are complementary of each other. This means that if duty cycle for switch $S_1$ is D, then the duty cycle for switch $S_2$ should be $(1-D)$. The asymmetrical PWM of the converter produces an output voltage $V_s$ as shown in FIG. 2. The time variation of $V_s$ may be represented by the following Fourier series:

$$V_s = V_i D + \Sigma 1.4 V_i/(n\pi) \cdot (1 - \cos 2\pi nD)^{\frac{1}{2}} \cdot \sin(n\omega_0 t + \phi_n) \quad (1)$$

where:
$D$ = Duty cycle for switch $S_1$
$n$ = order of nth harmonic
$V_i$ = DC input voltage (V)
$\omega_0$ = fundamental switching frequency (r/s), and
$\phi_n$ =

$$\tan^{-1}(\sin 2\pi nD/(1 - \cos 2\pi nD)) \quad (2)$$

As explained earlier, the series capacitor $C_s$ blocks the DC component of voltage $V_s$. Therefore, the AC component of $V_s$ which causes the resonant current to flow is given by:

$$V_{sac} = \Sigma 1.4 V_i/(n\pi) \cdot (1 - \cos 2\pi nD)^{\frac{1}{2}} \cdot \sin(n\omega_0 t + \phi_n) \quad (3)$$

Figure 3:
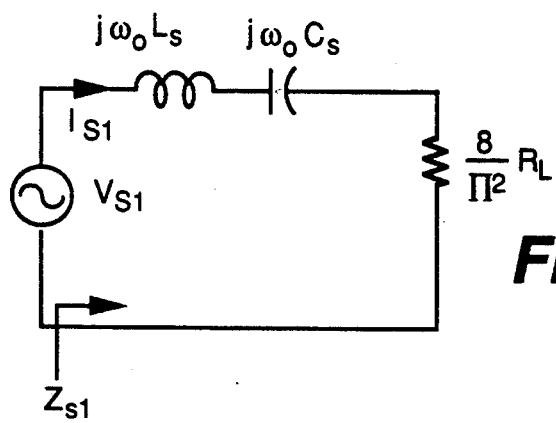
FIG. 3 is a fundamental equivalent circuit of the present converter.

In operation, each of the fundamental and harmonic voltage components, given by equation (3), produces fundamental and harmonic current through the series resonant circuit. However, to explain the control of the output voltage of the converter, only a fundamental component is considered. FIG. 3 shows the fundamental equivalent circuit of the converter. In the Figure, the inductive and capacitive reactances are shown as well as resistive reactance of the load.

The following relations are obtained from FIG. 3 and using equation (3):

Fundamental RMS voltage $V_{S1} = V_i/\pi \cdot (1 - \cos 2\pi D)^{\frac{1}{2}}$ (4)

Fundamental RMS current $I_{S1} = V_i/(Z_{si}\pi) \cdot (1 - \cos 2\pi D)^{\frac{1}{2}}$ (5)

The average output current $I_o = 0.9 V_i/(Z_{si}\pi) \cdot (1 - \cos 2\pi D)^{\frac{1}{2}}$ (6)

The output voltage of the converter $$V_o = 0.9 V_i R_L/(Z_{si}\pi) \cdot (1 - \cos 2\pi D)^{\frac{1}{2}} \quad (7)$$

$$= K(1 - \cos 2\pi D)^{\frac{1}{2}} \quad (8)$$

where:
$R_L$ = Resistive output load ($\Omega$)
$Z_{si}$ = Fundamental impedance at the input of resonant circuit including output load ($\Omega$)

Figure 4:
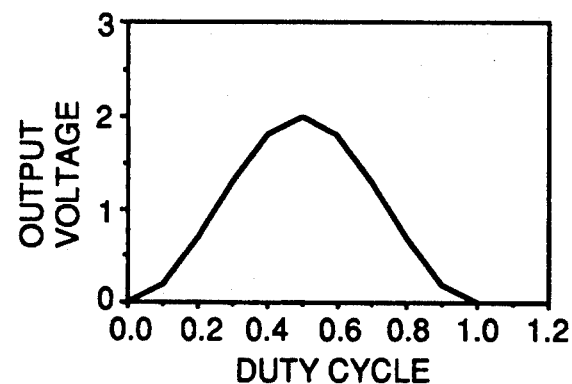
FIG. 4 is a graph showing the output voltage against the duty cycle.

FIG. 4 shows the output voltage of the converter as a function of duty cycle D. This figure shows that the output voltage of the converter can be varied, that is to say, controlled by changing the duty cycle D either from 0 to 0.5 (minimum-to-maximum output voltage) or 0.5 to 1.0 (maximum-to-minimum output voltage).

Figure 5:
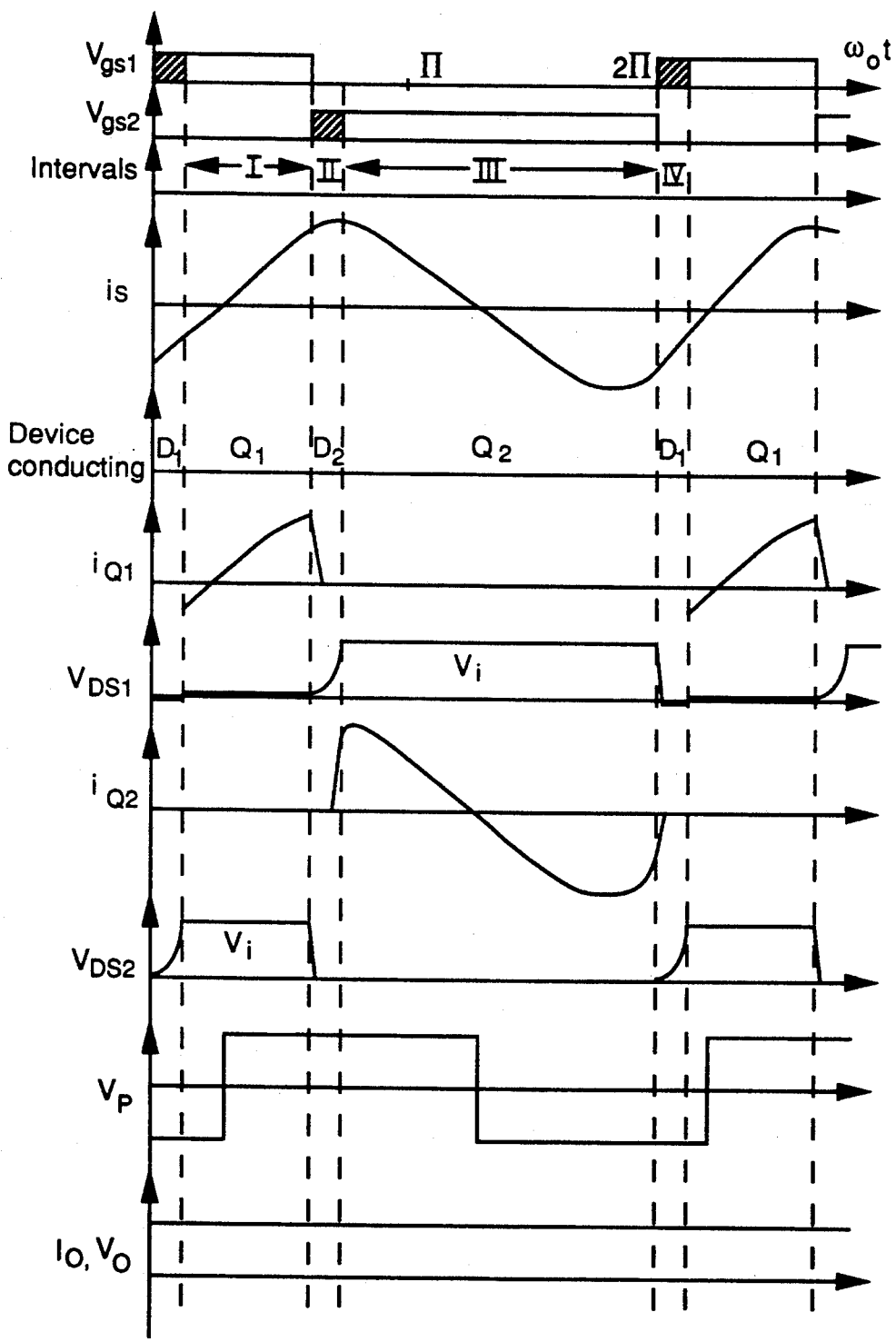
FIG. 5 illustrates wave forms of various parameters in time domain.

A description of the operation of the DC/DC converter as shown in FIG. 1 will now be given with reference to FIG. 5 which illustrates wave forms of various parameters in the time domain.

For a steady-state cycle, there exists four distinct intervals I, II, III, and IV in which the converter operates. For each interval, the operation of the converter is described below:

Interval I

At the beginning of this interval gating signal $V_{gs1}$ is applied across the gate and source of switch $S_1$. Switch $S_1$ starts to conduct and the current flowing through anti-parallel diode $D_1$ is now carried by the switch. Since diode $D_1$ was conducting prior to the conduction of switch $S_1$, turn-on of the switch is, therefore, obtained under zero voltage. This results in zero turn-on losses. During this interval a positive voltage $V_i$ appears at the output of the chopper circuit and power flows from the input DC source to the resonant circuit and the output load.

Interval II

At the beginning of this interval gating signal $V_{gs1}$ from the gate of switch $S_1$ has been removed. Switch $S_1$ starts to turn-off, and the snubber capacitor $C_1$ starts to charge. At the same time, because of the positive resonant current $i_s$, the snubber capacitor $C_2$ across switch $S_2$ starts to discharge to the resonant circuit. Once voltage across snubber capacitor $C_2$ reaches zero, the positive resonant current forces anti-parallel diode $D_2$ to conduct. A large value of snubber capacitor $C_1$ is employed across switch $S_1$ to provide a slow rise of voltage across switch $S_1$, thereby eliminating turn-off loss in the switch. (It will be explained during the description of Interval IV that the capacitor $C_1$ discharges to the resonant circuit, therefore, the snubber losses are zero.)

Interval III

At the beginning of this interval gating signal $V_{gs2}$ has been applied across the gate and source of switch $S_2$. The resonant current flowing through anti-parallel diode $D_2$ is now transferred to switch $S_2$. Since diode $D_2$ was conducting prior to the conduction of switch $S_2$, turn-on of the switch is, therefore, obtained under zero voltage which results in zero turn-on loss for the switch. During this interval, the output voltage of the chopper is clamped to zero. No additional energy from the DC source flows to the resonant circuit. However, the energy stored in the resonant components during Interval I now free wheels through the switch $S_2$ and keeps supplying power to the output load.

Interval IV

At the beginning this interval gating signal $V_{gs2}$ from the gate of switch $S_2$ has been removed. Switch $S_2$ starts to turn-off and snubber capacitor $C_2$ starts to charge. At the same time because of the negative resonant current $i_s$, the snubber capacitor $C_1$ starts to discharge to the resonant circuit. Once the voltage across capacitor $C_1$ reaches zero, the negative resonant current forces anti-parallel diode $D_1$ to conduct. Since the capacitor $C_1$ discharges to the resonant circuits, the snubber losses are essentially zero. As explained in Interval II, snubber capacitor $C_2$ also discharges to the resonant circuit and therefore permits the use of a large capacitance across switch $S_2$. This provides a slow rise of voltage across switch $S_2$ which eliminates turn-off losses of the switch.

The above description of the converter operation reveals that the switches are always turned-on and turned-off under zero voltage, thereby eliminating the switching losses. Furthermore, the snubber capacitors always discharge to the resonant circuit, which also eliminates the snubber losses.

The APWM resonant converter (Asymmetrical PWM converter according to the present invention) and a PWM resonant converter (symmetrical PWM converter of prior art) were compared for their performance. The table appended at the end of the disclosure shows the efficiencies for these two converters as a function of input voltage at 1 MHz operating frequency. As can be seen from this table, the efficiency of the APWM converter is about 15% higher than the efficiency of the PWM converter circuit at a nominal voltage of 60 V.

Figure 6:
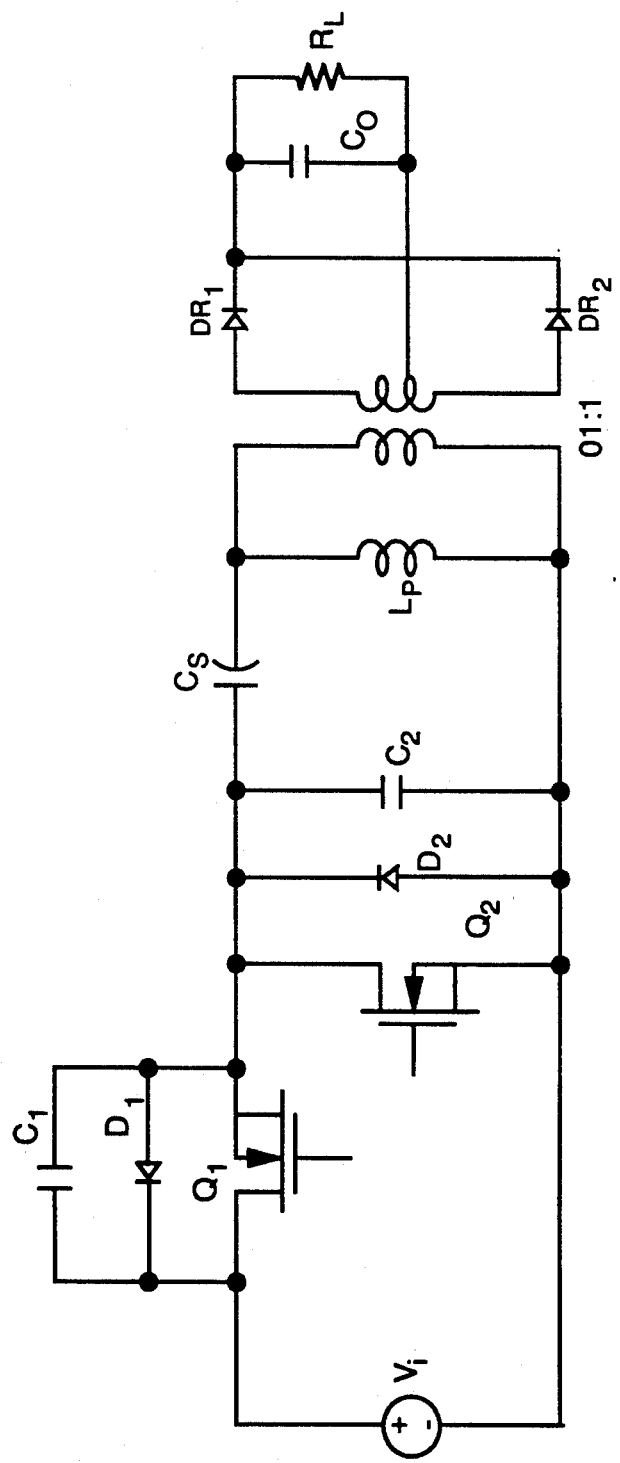
FIGS. 6 and 7 depict circuit diagrams of converters according to yet other embodiments of the present invention.

FIG. 6 shows an APWM parallel resonant DC/DC converter according to another embodiment of the present invention. The configuration of this circuit is essentially the same as that of the converter circuit of FIG. 1 except that the resonant inductor $L_p$ is placed in parallel with the output transformer. This configuration has the advantage that the parallel inductor can easily be integrated with the transformer which results in a reduced count of power components.

Figure 7:
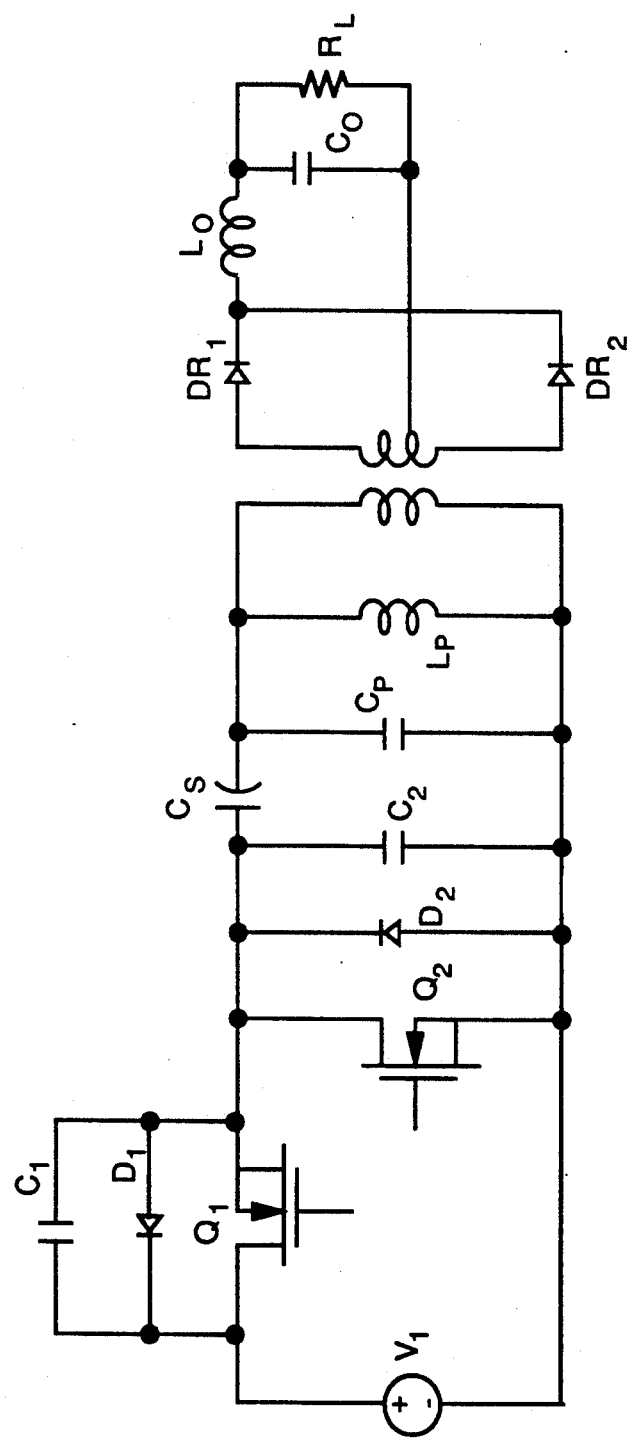

FIG. 7 shows one other embodiment of the APWM resonant converter. This circuit has a similar configuration as the circuit of FIG. 6 except that an additional capacitor $C_p$ is placed across the inductor and the output filter has one inductor and one capacitor. Although this configuration has a higher power component count, it is better suited for applications with ultra low ripples in output voltage.

The new class of Asymmetrical Pulse Width Modulated Resonant Converter Topology of the present invention has simple power and control circuitry, and exhibits near zero switching losses at constant operating frequency. Initial bread-board results show significant potential of their use in all future applications where a distributed power architecture is chosen to power high speed digital circuits in a system.

TABLE

| COMPARISON OF EFFICIENCIES | | |
|---|---|---|
| INPUT VOLTAGE | EFFICIENCY PROPOSED ART | EFFICIENCY PRIOR ART |
| 50 V | 88.5% | 87.0% |
| 50 V | 88.3% | 80.0% |
| 60 V | 88.2% | 73.0% |
| 65 V | 88.5% | 70.0% |
| 70 V | 87.0% | 65.0% |
| 75 V | 84.5% | 62.0% |

Operating Frequency = 1 MHz
Output Voltages = 5 V @ 3 A
= 15 V @ 1 A

I claim:
1. An asymmetrical pulse width modulated constant frequency resonant DC/DC converter, comprising:
   bridged chopper means for converting a DC input to an AC of a constant high frequency;
   resonant circuit means connected to said bridged chopper means and including a series resonant capacitor and a resonant inductor for sending said high frequency AC to high frequency transformer means to generate a transformer secondary AC; and
   rectifier means connected to said high frequency transformer means to rectify said transformer secondary AC to produce a stable DC output;
   in that said bridged chopper means include at least two semiconductor switches, each having a snubber capacitor connected thereacross, said switches being alternately made conducting by respective gating pulse signals applied thereto at said constant high frequency, the duty cycles of said gating pulse signals and thus the duty cycles of the conduction of said switches being complementary with one another, and said duty cycles of said gating pulse signals being further adjustable to maintain said stable DC output.
2. The asymmetrical pulse width modulated constant frequency resonant DC/DC converter according to claim 1, wherein:
   said resonant inductor is connected in series with said high frequency transformer.

3. The asymmetrical pulse width modulated constant frequency resonant DC/DC converter according to claim 1, wherein:
   said resonant inductor is connected in parallel with said high frequency transformer.

4. The asymmetrical pulse width modulated constant frequency resonant DC/DC converter according to claim 3, wherein:
   said resonant circuit means further comprises a parallel resonant capacitor connected in parallel with said parallel resonant inductor.

5. The asymmetrical pulse width modulated constant frequency resonant DC/DC converter according to claim 2, wherein:
   said resonant inductor is an integral part of said high frequency transformer.

6. The asymmetrical pulse width modulated constant frequency resonant DC/DC converter according to claim 3, wherein:
   said resonant inductor is an integral part of said high frequency transformer.

* * * * *